United States Patent
Fujiwara et al.

(10) Patent No.: US 8,741,995 B2
(45) Date of Patent: Jun. 3, 2014

(54) SURFACE-TREATED CALCIUM CARBONATE AND PASTE-LIKE RESIN COMPOSITION CONTAINING SAME

(75) Inventors: Shinjiro Fujiwara, Amagasaki (JP); Yoshisada Kayano, Nishinomiya (JP); Peter-Christian Rainer, Villach (AT); Gernot Primosch, Villach (AT)

(73) Assignee: Shiraishi Kogyo Kaisha, Ltd., Osaka (JP)

(*) Notice: Subject to any disclaimer, the term of this patent is extended or adjusted under 35 U.S.C. 154(b) by 0 days.

(21) Appl. No.: 13/578,769

(22) PCT Filed: Feb. 15, 2010

(86) PCT No.: PCT/JP2010/052151
§ 371 (c)(1),
(2), (4) Date: Aug. 13, 2012

(87) PCT Pub. No.: WO2011/099154
PCT Pub. Date: Aug. 18, 2011

(65) Prior Publication Data
US 2012/0309877 A1    Dec. 6, 2012

(51) Int. Cl.
*C08K 9/00* (2006.01)
*C07F 9/90* (2006.01)

(52) U.S. Cl.
USPC ............... 524/301; 523/200; 106/465

(58) Field of Classification Search
USPC ............ 523/200; 524/301; 528/422; 106/465
See application file for complete search history.

(56) References Cited

U.S. PATENT DOCUMENTS

| | | | |
|---|---|---|---|
| 6,686,044 B2 * | 2/2004 | Nakai et al. | 428/403 |
| 7,186,763 B2 * | 3/2007 | Kayano et al. | 523/205 |
| 8,329,802 B2 * | 12/2012 | Hasegawa et al. | 524/425 |
| 2004/0242748 A1 | 12/2004 | Takahashi et al. | |
| 2005/0004266 A1 | 1/2005 | Kayano et al. | |
| 2008/0182933 A1 | 7/2008 | Shimizu et al. | |

FOREIGN PATENT DOCUMENTS

| | | |
|---|---|---|
| JP | 11-349846 A | 12/1999 |
| JP | 2001-158863 A | 6/2001 |
| JP | 2002-220547 A | 8/2002 |
| JP | 2002-256106 A | 9/2002 |
| JP | 2002-309125 A | 10/2002 |
| JP | 2002-363443 A | 12/2002 |
| JP | 2003-147227 A | 5/2003 |
| JP | 2003-171121 A | 6/2003 |
| JP | 2003-295502 A | 10/2003 |
| JP | 2003-342553 A | 12/2003 |
| JP | 2004-331963 A | 11/2004 |
| JP | 2005-336417 A | 12/2005 |
| JP | 2006-169421 A | 6/2006 |
| JP | 2006-265472 A | 10/2006 |
| JP | 2007-045935 A | 2/2007 |
| JP | 2007-197585 A | 8/2007 |
| JP | 4208838 B2 | 1/2009 |
| WO | 2004/031303 A1 | 4/2004 |
| WO | 2006/067144 A1 | 6/2006 |

OTHER PUBLICATIONS

International Search Report of PCT/JP2010/052151, mailing date May 11, 2010.
International Preliminary Examination Report of PCT/JP2010/052151, mailing date Dec. 9, 2010.

* cited by examiner

*Primary Examiner* — Hannah Pak
(74) *Attorney, Agent, or Firm* — Westerman, Hattori, Daniels & Adrian, LLP

(57) ABSTRACT

A calcium carbonate having a surface treated with a surface treating agent containing a sodium salt or a potassium salt of a fatty acid, the surface treating agent containing a sodium salt or a potassium salt of palmitic acid in an amount of PW in terms of acid, the surface treating agent containing a sodium salt or a potassium salt of stearic acid in an amount of SW in terms of acid, a total amount of PW and SW being PW+SW≥90, a ratio of PW to SW being 0.30≤PW/SW≤1.1, the surface-treated calcium carbonate having a BET specific surface area of $SA_2$ of $15 \leq SA2 \leq 48$, and the sodium salt or the potassium salt of the fatty acid being used for the treatment in an amount of FA and a ratio ($FA/SA_2$) being $0.095 \leq FA/SA_2 \leq 0.135$.

8 Claims, No Drawings

SURFACE-TREATED CALCIUM CARBONATE AND PASTE-LIKE RESIN COMPOSITION CONTAINING SAME

TECHNICAL FIELD

The present invention relates to a surface-treated calcium carbonate and a paste-like resin composition containing the surface-treated calcium carbonate.

BACKGROUND ART

For adhesives, sealing materials, and the like, a paste sol is prepared, and the sol is used for coating, painting, construction, mixing, and the like. When the paste sol cannot include a filler in a large amount due to the physical quality of a cured product of the sol, such a paste sol employs a filler capable of imparting high viscosity to the sol in a small amount, such as fumed silica.

The fumed silica exhibits excellent thixotropic properties but has a problem of causing extreme change in viscosity depending on a very small variation in the amount added.

Meanwhile, calcium carbonate is used as a filler for various polymer materials such as plastics, rubbers, inks, paints, sealing materials, PVC sols, and acrylic sols. Therefore, if the addition of calcium carbonate can impart excellent thixotropic properties, such a calcium carbonate can be used as a relatively inexpensive thixotropic property imparting agent.

Patent Document 1 discloses a surface-treated calcium carbonate of which surface is treated with an unsaturated fatty acid and a saturated fatty acid in a predetermined mixing ratio. When the surface-treated calcium carbonate is used and added to inks, paints, sealing materials, PVC sols, acrylic sols, and the like, excellent thixotropic properties can be imparted to the materials.

However, from the viewpoints of environmental health and the like, the reduction of the amount of an adhesion imparting agent and the like has recently been considered. The use of the surface-treated calcium carbonate in the related art achieves excellent thixotropic properties, but when an adhesion imparting agent is used in a reduced amount, a cured product from such a material has poor mechanical properties and especially has poor tensile properties. Therefore, there is a demand for a surface-treated calcium carbonate achieving high viscosity and excellent thixotropic properties and capable of imparting good mechanical properties to a cured product from such a material. As the physical properties and qualities of the cured products of an adhesive and a sealant, the mechanical properties are also important properties for the adhesive and the sealant. The tensile strength and the like are strictly regulated under ISO standards and Japanese Industrial Standards and sufficiently high performance is desired.

Patent Documents 2 to 14 disclose surface-treated calcium carbonates for imparting high viscosity and excellent thixotropic properties. Even when the surface-treated calcium carbonate disclosed in the related art is used, a cured product from the material has poor mechanical properties and poor adhesion properties, and it has been difficult to impart sufficient mechanical properties and sufficient adhesion properties to the cured product.

Patent Document 15 discloses a calcium carbonate having a surface treated with a surface treating agent containing lauric acid and myristic acid in an amount of 85% or more. However, even when such a surface-treated calcium carbonate is used, it has been difficult to impart high viscosity and excellent thixotropic properties.

In general, when a calcium carbonate surface is surface treated with a fatty acid, a paste sol curable resin composition containing the calcium carbonate obtains improved viscosity properties but the use of the fatty acid adversely affects a cured product of the composition to have poor mechanical properties and poor adhesion properties.

CITATION LIST

Patent Literatures

Patent Document 1: JP-A No. 2003-171121
Patent Document 2: JP-A No. 2007-197585
Patent Document 3: JP-A No. 2006-169421
Patent Document 4: JP-A No. 2005-336417
Patent Document 5: JP-A No. 2004-331963
Patent Document 6: JP-A No. 2003-342553
Patent Document 7: JP-A No. 2003-147227
Patent Document 8: JP-A No. 2003-295502
Patent Document 9: JP-A No. 2002-363443
Patent Document 10: JP-A No. 2002-309125
Patent Document 11: JP-A No. 2002-220547
Patent Document 12: JP-A No. 2001-158863
Patent Document 13: JP-A No. 1999-349846
Patent Document 14: WO 2006/067144
Patent Document 15: WO 2004/031303

SUMMARY OF INVENTION

Technical Problem

An object of the present invention is to provide a surface-treated calcium carbonate that can impart high viscosity and excellent thixotropic properties to a paste-like resin composition when the surface-treated calcium carbonate is added to the paste-like resin composition and that can achieve good mechanical properties and good adhesion properties in a cured product of the paste-like resin composition and a paste-like resin composition containing the surface-treated calcium carbonate.

Solution to Problem

The surface-treated calcium carbonate of the present invention is a calcium carbonate having a surface treated with a surface treating agent containing a sodium salt or a potassium salt of a fatty acid. The surface treating agent contains a sodium salt or a potassium salt of palmitic acid in an amount of PW (% by weight) in terms of acid, the surface treating agent contains a sodium salt or a potassium salt of stearic acid in an amount of SW (% by weight) in terms of acid, a total amount of PW and SW is PW+SW 90, and a ratio of PW to SW is $0.30 \leq PW/SW \leq 1.1$. The surface-treated calcium carbonate has a BET specific surface area of $SA_2$ ($m^2/g$), the sodium salt or the potassium salt of the fatty acid is used for the treatment in an amount of FA (parts by weight) in terms of acid based on 100 parts by weight of calcium carbonate, the BET specific surface area ($SA_2$) is $15 \leq SA_2 \leq 48$, and a ratio ($FA/SA_2$) of the treatment amount (FA) to the BET specific surface area ($SA_2$) is $0.095 \leq FA/SA_2 \leq 0.135$.

The surface-treated calcium carbonate according to the present invention can impart high viscosity and excellent thixotropic properties to a paste-like resin composition when the surface-treated calcium carbonate is added to the paste-like resin composition and can achieve good mechanical properties and good adhesion properties in a cured product of the paste-like resin composition.

In the invention, it is preferable that the surface-treated calcium carbonate is extracted with diethyl ether to afford a treating agent extraction amount of 0.1% by weight or less.

In the invention, it is preferable that a sodium salt or a potassium salt of a fatty acid except palmitic acid and stearic acid is a sodium salt or a potassium salt of a fatty acid having 14 to 22 carbon atoms.

A paste resin composition of the present invention is characterized by including the surface-treated calcium carbonate of the present invention.

The paste-like resin composition of the present invention has high viscosity and excellent thixotropic properties because the composition includes the surface-treated calcium carbonate of the present invention.

Examples of the paste-like resin composition of the present invention include a two-pack curable polyurethane paste-like resin composition, a two-pack curable polysulfide resin composition, a one-pack modified silicone composition, and a PVC plastisol composition.

The cured product of the paste-like resin composition of the present invention is a cured product of the paste-like resin composition of the present invention. The cured product of the paste resin composition of the present invention exhibits good mechanical properties and good adhesion properties because the cured product includes the surface-treated calcium carbonate of the present invention.

Advantageous Effects of Invention

The surface-treated calcium carbonate of the present invention can impart high viscosity and excellent thixotropic properties to a paste-like resin composition when the surface-treated calcium carbonate is added to the paste-like resin composition and can achieve good mechanical properties and good adhesion properties in a cured product of the paste-like resin composition.

The paste resin composition of the present invention has high viscosity and excellent thixotropic properties because the composition includes the surface-treated calcium carbonate of the present invention.

The cured product of the paste-like resin composition of the present invention has good mechanical properties and good adhesion properties because the cured product includes the surface-treated calcium carbonate of the present invention.

DESCRIPTION OF EMBODIMENTS

Hereinafter, the present invention will be described in further detail.

(Calcium Carbonate Particles)

In the invention, the calcium carbonate particles having a surface to be treated are not particularly limited and any calcium carbonate particles can be used as long as they can be used as a filler for various polymer materials. Examples of such calcium carbonate include natural calcium carbonate (heavy calcium carbonate) and synthetic calcium carbonate (precipitated (colloidal) calcium carbonate). The natural calcium carbonate is produced directly from raw limestone and can be produced, for example, by pulverizing and classifying raw limestone.

The synthetic calcium carbonate is produced from calcium hydroxide and can be produced, for example, by reacting calcium hydroxide with carbon dioxide gas. The calcium hydroxide can be produced, for example, by reacting calcium oxide with water. The calcium oxide can be produced, for example, by calcining raw limestone in combination with coke or the like. In this case, carbon dioxide gas is generated during calcination. Hence, calcium carbonate can be produced by reacting the carbon dioxide gas with calcium hydroxide.

In general, surface treatment slightly reduces a BET specific surface area. Therefore, the calcium carbonate before surface treatment is preferably a calcium carbonate having a slightly larger BET specific surface area than the BET specific surface area of the calcium carbonate after surface treatment.

In the surface treating agent in the present invention, the total amount (PW+SW) of the amount (PW) of a sodium salt or a potassium salt of palmitic acid in terms of acid and the amount (SW) of a sodium salt or a potassium salt of stearic acid in terms of acid is designed so as to be PW+SW≥90% by weight. A surface treating agent designed to have such an amount can increase mechanical properties and adhesion properties of a cured product of a paste-like resin composition containing the surface-treated calcium carbonate of the present invention.

PW+SW is preferably 92% by weight or more, more preferably 95% by weight or more, and even more preferably 98% by weight or more.

In the surface treating agent in the present invention, the ratio (PW/SW) of the amount (PW) of the sodium salt or the potassium salt of palmitic acid in terms of acid with respect to the amount (SW) of the sodium salt or the potassium salt of stearic acid in terms of acid is designed so as to be within a range 0.30≤PW/SW≤1.1.

A surface treating agent having an excessively low PW/SW ratio cannot achieve excellent thixotropic properties when the agent is added to a paste-like resin composition. While, a surface treating agent having an excessively high PW/SW ratio cannot achieve excellent thixotropic properties when the agent is added to a paste-like resin composition.

PW/SW is preferably 0.5≤PW/SW≤0.8, more preferably 0.55≤PW/SW≤0.8, and even more preferably 0.6≤PW/SW≤0.7.

(Sodium Salt and Potassium Salt of Fatty Acid except Palmitic Acid and Stearic Acid)

The surface treating agent in the present invention may include a sodium salt or a potassium salt of an additional saturated fatty acid along with the sodium salt and the potassium salt of palmitic acid and the sodium salt and the potassium salt of stearic acid.

Examples of the saturated fatty acid except palmitic acid and stearic acid include saturated fatty acids having 12, 14, and 20 to 31 carbon atoms. Saturated fatty acids having 12, 14, and 20 to 26 carbon atoms are preferred and saturated fatty acids having 12, 14, and 20 to 22 carbon atoms are more preferred. Specific examples of the saturated fatty acid include lauric acid, myristic acid, arachidic acid, behenic acid, lignoceric acid, cerotic acid, montanoic acid, and melissic acid. The additional saturated fatty acid is used in a form of a sodium salt of the saturated fatty acid and/or a potassium salt of the saturated fatty acid. In particular, lauric acid and myristic acid are preferably included in a total amount of 5% by weight or less. The total amount is more preferably 4% by weight or less, even more preferably 3% by weight or less, furthermore preferably 2% by weight or less, and still furthermore preferably 1% by weight or less. In the invention, a sodium salt is particularly preferably used.

In the invention, as discussed above, calcium carbonate is surface treated with the surface treating agent containing the sodium salt or the potassium salt of palmitic acid and/or stearic acid. The surface treating agent may include a sodium salt or a potassium salt of an unsaturated fatty acid as the sodium salt or the potassium salt of the additional fatty acid, and such an unsaturated fatty acid is preferably included in an amount of 5% by weight or less in terms of acid. A surface treating agent including the sodium salt and the potassium salt of the unsaturated fatty acid in an amount of more than 5% by weight may reduce adhesion properties or tensile strength. The amount of the sodium salt and the potassium salt of the unsaturated fatty acid is more preferably 4% by weight or less, even more preferably 3% by weight or less, furthermore preferably 2% by weight or less, and still furthermore preferably 1% by weight or less (in terms of acid).

Specific examples of the unsaturated fatty acid include oleic acid, erucic acid, and linoleic acid.

In the invention, the amount of a sodium salt or a potassium salt of a fatty acid in terms of acid in the surface treating agent is the amount obtained by conversion of all of the sodium salt or the potassium salt of the fatty acid in the surface treating agent into a corresponding fatty acid.

(Surface Treating Agent)

The surface treating agent in the present invention includes, as discussed above, the sodium salt and the potassium salt of palmitic acid and the sodium salt and the potassium salt of stearic acid in a total amount of 90% by weight or more in terms of acid and includes the sodium salt and the potassium salt of the additional fatty acid in an amount of less than 10% by weight in terms of acid. Provided that the conditions are satisfied, the surface treating agent may include any surface treating agent in addition to the sodium salt and the potassium salt of palmitic acid, the sodium salt and the potassium salt of stearic acid, and the sodium salt and the potassium salt of the additional saturated fatty acid. For example, as long as the effect of the invention is not lost, the surface treating agent may include palmitic acid, stearic acid, and the additional fatty acid in an acid form. The surface treating agent may further include a salt of a sulfonic acid such as an alkylbenzenesulfonic acid, a sodium salt or a potassium salt of a resin acid, and the like as long as the effect of the invention is not lost.

(Surface-Treated Calcium Carbonate)

The surface-treated calcium carbonate of the present invention is a calcium carbonate having a surface treated with the surface treating agent.

The surface-treated calcium carbonate of the present invention has a BET specific surface area of 15 to 48 $m^2/g$. A surface-treated calcium carbonate having a BET specific surface area of less than 15 $m^2/g$ cannot achieve excellent thixotropic properties. A surface-treated calcium carbonate having a BET specific surface area of more than 48 $m^2/g$ has an excessively small particle size of calcium carbonate and this leads to the aggregation of the calcium carbonate particles. Hence, such a calcium carbonate cannot achieve high viscosity and excellent thixotropic properties. The BET specific surface area is preferably in a range of 17 to 35 $m^2/g$. The BET specific surface area is more preferably in a range of 18 to 30 $m^2/g$ and even more preferably in a range of 18 to 25 $m^2/g$. The BET specific surface area is furthermore preferably in a range of 19 to 24 $m^2/g$ and still furthermore preferably in a range of 19 to 23 $m^2/g$.

In the invention, when the sodium salt or the potassium salt of the fatty acid is used for the treatment in an amount of FA (parts by weight) in terms of acid with respect to 100 parts by weight of calcium carbonate, the ratio ($FA/SA_2$) of the treatment amount (FA) to the BET specific surface area ($SA_2$) is $0.095 \leq FA/SA_2 \leq 0.135$. A surface-treated calcium carbonate having an excessively small $FA/SA_2$ ratio cannot sufficiently achieve the effects of the invention, in other words, cannot impart high viscosity and excellent thixotropic properties.

When a surface-treated calcium carbonate having an excessively large $FA/SA_2$ ratio is added to a paste-like resin composition, a cured product of the composition has reduced mechanical properties and reduced adhesion properties. Such a surface-treated calcium carbonate is required to use the surface treating agent in a large amount and this increases the cost to result in economic disadvantage.

The ratio $FA/SA_2$ is preferably $0.100 \leq FA/SA_2 \leq 0.130$, more preferably $0.105 \leq FA/SA_2 \leq 0.125$, even more preferably $0.110 \leq FA/SA_2 \leq 0.120$, and furthermore preferably $0.112 \leq FA/SA_2 \leq 0.118$.

In the invention, it is preferable that the surface-treated calcium carbonate is extracted with diethyl ether to afford a treating agent extraction amount of 0.1% by weight or less.

In the invention, calcium carbonate is surface treated with the surface treating agent containing the sodium salt or the potassium salt of palmitic acid and/or stearic acid. Examples of the method for surface treatment include, as described later, a method of adding the surface treating agent into a slurry liquid of calcium carbonate particles and stirring the mixture for treatment. It is supposed that a sodium salt or a potassium salt of a fatty acid such as palmitic acid and stearic acid added into the slurry liquid of calcium carbonate particles is reacted with calcium present on the surface of calcium carbonate to be converted into a calcium salt of a corresponding fatty acid such as palmitic acid and stearic acid. The calcium salt of a fatty acid such as palmitic acid and stearic acid is difficult to be dissolved in diethyl ether. Hence, by extracting the surface-treated calcium carbonate with diethyl ether as mentioned above, palmitic acid, stearic acid, and an additional fatty acid adhering onto the surface of the surface-treated calcium carbonate in an acid form and fatty acid salts still present in a sodium salt form or a potassium salt form can be dissolved and extracted. As an index showing the amount of a fatty acid adhering in such an acid form, a fatty acid salt adhering in a sodium salt form or a potassium salt form, and other adhering organic substances, the treating agent extraction amount is defined in the present invention. The treating agent extraction amount can be determined in accordance with the equation below.

Treating agent extraction amount (% by weight)=
[(weight of surface-treated calcium carbonate before extraction−weight of surface-treated calcium carbonate after extraction)/(weight of surface-treated calcium carbonate before extraction)]×100

From the treating agent extraction amount, the amount of fatty acids such as palmitic acid and stearic acid and salts of them that adhere onto the surface of the surface-treated potassium carbonate in an acid form or in a sodium salt form or a potassium salt form can be determined.

In the invention, the treating agent extraction amount is preferably 0.1% by weight or less, more preferably 0.09% by weight or less, even more preferably 0.08% by weight or less, furthermore preferably 0.07% by weight or less, still furthermore preferably 0.06% by weight or less, and most preferably 0.05% by weight or less. A surface-treated calcium carbonate having an excessively large treating agent extraction amount is likely to provide a cured product having poor mechanical properties and poor adhesion properties. The lower limit of the treating agent extraction amount is not particularly limited but is, for example, 0.005% by weight or more.

(Production of Surface-Treated Calcium Carbonate)

The surface-treated calcium carbonate of the present invention can be produced by adding the surface treating agent into a slurry liquid of calcium carbonate particles and stirring the mixture. As described above, a sodium salt or a potassium salt of a fatty acid such as palmitic acid is reacted with calcium on the calcium carbonate surface to be converted into an insoluble calcium salt, and the surface treatment can be completed. Then, the slurry liquid of the surface-treated calcium carbonate is subjected to dehydration and drying and consequently the surface-treated calcium carbonate powder can be obtained. The ratio of fatty acids such as palmitic acid in the surface-treated calcium carbonate obtained here is little changed before and after the surface treatment.

The solid content of calcium carbonate in the slurry liquid of calcium carbonate can be appropriately controlled considering the dispersibility of calcium carbonate particles, easiness of dehydration, and the like. The solid content can also be appropriately controlled depending on the particle size of calcium carbonate particles and the like. In general, a slurry liquid having an appropriate viscosity can be prepared by controlling the solid content in the slurry to be about 2 to 30% by weight and preferably about 5 to 20% by weight. A slurry liquid using water in an excessively large amount makes the dehydration difficult and is undesirable also from the viewpoint of effluent processing and the like.

(Paste-Like Resin Composition)

When the surface-treated calcium carbonate of the present invention is added to a paste-like resin such as an adhesive and a sealing material, the paste-like resin can obtain high viscosity and excellent thixotropic properties as well as good curing characteristics. The amount of the surface-treated calcium carbonate included in the paste-like resin can be appropriately controlled depending on, for example, an adding purpose and characteristics required for the paste-like resin.

(Polyurethane Paste-Like Resin Composition)

A two-pack curable polyurethane paste-like resin composition usable as a polyurethane sealant and the like mainly includes a isocyanate, a polyol, a plasticizer, a filler, and other additives.

Examples of the isocyanate include tolylene diisocyanate (TDI), 4,4-diphenylmethane diisocyanate (MDI), 1,5-naphthalene diisocyanate, tolidine diisocyanate (TODI), xylene diisocyanate, hexamethylene diisocyanate and a modified compound of hexamethylene diisocyanate, dicyclohexylmethane diisocyanate (hydrogenated MDI), and isophorone diisocyanate (IPDI).

Examples of the polyol include a dicarboxylic acid such as adipic acid, phthalic acid, sebacic acid, and a dimer acid; and a glycol such as ethylene glycol, diethylene glycol, propylene glycol, butylene glycol, 1,3-butanediol, hexanetriol, and trimethylolpropane. Additional examples of the polyol include an ester obtained by ring-opening polymerization of caprolactone.

Examples of the plasticizer include dimethyl phthalate (DMP), diethyl phthalate (DEP), di-n-butyl phthalate (DBP), diheptyl phthalate (DHP), dioctyl phthalate (DOP), diisononyl phthalate (DINP), diisodecyl phthalate (DIDP), ditridecyl phthalate (DTDP), butyl benzyl phthalate (BBP), dicyclohexyl phthalate (DCHP), a tetrahydrophthalic acid ester, dioctyl adipate (DOA), diisononyl adipate (DINA), diisodecyl adipate (DIDA), a di-n-alkyl adipate, dibutyl diglycol adipate (BXA), bis(2-ethylhexyl) azelate (DOZ), dibutyl sebacate (DBS), dioctyl sebacate (DOS), dibutyl maleate (DBM), di-2-ethylhexyl maleate (DOM), dibutyl fumarate (DBF), tricresyl phosphate (TCP), triethyl phosphate (TEP), tributyl phosphate (TBP), tris(2-ethylhexyl) phosphate (TOP), tri(chloroethyl) phosphate (TCEP), trisdichloropropyl phosphate (CRP), tributoxyethyl phosphate (TBXP), tris (β-chloropropyl) phosphate (TMCPP), triphenyl phosphate (TPP), octyl diphenyl phosphate (CDP), acetyl triethyl citrate, and tributyl acetylcitrate. Additional examples of the plasticizer include a trimellitate plasticizer, a polyester plasticizer, a chlorinated paraffin, a stearate plasticizer, and dimethyl polysiloxane.

Examples of the filler (including a thickener) include an inorganic filler and an organic filler. Examples of the inorganic filler include calcium carbonate (a natural product and a synthetic product), calcium-magnesium carbonate (a natural product and a synthetic product), basic magnesium carbonate, quartz powder, silica powder, finely-divided silica (a dry-process product, a wet-process product, and a gel-process product), finely-divided calcium silicate, finely-divided aluminum silicate, kaolin clay, pyrophyllite clay, talc, sericite, mica, bentonite, nepheline-syenite, aluminium hydroxide, magnesium hydroxide, barium sulfate, carbon black (furnace, thermal, and acetylene), and graphite; and examples of acicular and fibrous inorganic fillers include sepiolite, wollastonite, xonotlite, potassium titanate, carbon fibers, mineral fibers, glass fibers, Shirasu balloons, fly ash balloons, glass balloons, silica beads, alumina beads, and glass beads. Examples of the organic filler include a powdered or bead-like organic filler such as wood powder, walnut powder, cork powder, wheat flour, starch, ebonite powder, rubber powder, lignin, a phenol resin, a high-styrene resin, a polyethylene resin, a silicone resin, and a urea resin; and a fibrous organic filler such as cellulose powder, pulp powder, synthetic fiber powder, amide wax, and castor oil wax.

The polyurethane paste-like resin composition of the present invention preferably contains the surface-treated calcium carbonate in an amount of 10 to 400 parts by weight and more preferably 10 to 300 parts by weight based on 100 parts by weight of the total amount of the resin component (including the plasticizer) and liquid additives.

(Polysulfide Paste-Like Resin Composition)

A two-pack curable polysulfide paste-like resin composition such as a polysulfide sealant mainly includes a polysulfide resin, a plasticizer, a filler, and other additives.

As the polysulfide resin, a polysulfide resin produced, for example, in the following manner is used. Ethylene oxide is reacted with hydrochloric acid to give ethylene chlorohydrin; ethylene chlorohydrin is reacted with paraformaldehyde to give dichloroethyl formal as a starting material; dichloro formal is added into a colloidal suspension of sodium polysulfide, a small amount of an activator, and magnesium hydroxide while stirring and heating the suspension; and consequently the polysulfide resin can be produced.

In recent years, a modified polysulfide resin that has a molecular terminal with an SH group (mercapto group) and has a main chain with a urethane bond has often been used.

The plasticizer, the filler, and the other additives usable are the same as those described for the polyurethane paste-like resin composition.

The surface-treated calcium carbonate is preferably contained in an amount of 10 to 400 parts by weight and more preferably 10 to 300 parts by weight based on 100 parts by weight of the total amount of the polysulfide resin (modified polysulfide resin), the plasticizer, and liquid additives.

(Modified Silicone Paste-Like Resin Composition)

A one-pack modified silicone paste-like resin composition such as a modified silicone sealant is mainly composed of a modified silicone resin, a plasticizer, a filler, and other additives. The modified silicone resin is a resin obtained by introducing a reactive silicone functional group at a terminal of a polymer for modification of the polymer and has a completely different molecular structure from that of a silicone resin.

As the modified silicone resin, a modified silicone resin produced, for example, in the following manner is used. A terminal hydroxy group of polyoxypropylene glycol is converted into an alkoxide group, and then the obtained product is reacted with a polyvalent halogen compound to increase the molecular weight, followed by a molecular weight increasing reaction to further increase the molecular weight. Then, an organic halogen compound represented by $CH_2$=CHRX is reacted for the introduction of an olefin group to the terminal, followed by a dechlorination purification process, and then the product is subjected to a hydrosilylation reaction for the introduction of a reactive silicone functional group to the terminal, and consequently the modified silicone resin is produced.

The plasticizer, the filler, and the other additives usable are the same as those described for the polyurethane paste-like resin composition.

The surface-treated calcium carbonate is preferably contained in an amount of 10 to 400 parts by weight and more preferably 10 to 300 parts by weight based on 100 parts by weight of the total amount of the modified silicone resin, the plasticizer, and liquid additives.

(Polyvinyl Chloride Plastisol Resin Composition)

A polyvinyl chloride (PVC) plastisol resin composition mainly includes a vinyl chloride resin, a plasticizer, a filler, and other additives. The plasticizer, the filler, and the other additives usable are the same as those described for the polyurethane paste-like resin composition.

The surface-treated calcium carbonate is preferably contained in an amount of 10 to 400 parts by weight and more preferably 10 to 300 parts by weight based on 100 parts by weight of the total amount of the vinyl chloride resin, the plasticizer, and liquid additives.

EXAMPLES

Hereinafter, the present invention will be described in further detail with reference to examples, but it should be understood that the present invention is not limited to the following examples and that various modifications and changes may be made without departing from the scope of the present invention. The unit "%" shown below means "% by weight" unless otherwise specified.

Method for Producing Surface-Treated Calcium Carbonate

Example 1

To 2 kg of synthetic calcium carbonate having a BET specific surface area of 22.2 $m^2/g$, water warmed at 60° C. was added so as to give a solid content of 10% by weight and a calcium carbonate slurry liquid was prepared using a stirring disperser. While stirring the slurry liquid with the disperser, 54 g of mixed fatty acid sodium salt in which 21.6 g of sodium palmitate and 32.4 g of sodium stearate (19.9 g of palmitic acid and 27.9 g of stearic acid in terms of acid) were mixed was added to the calcium carbonate slurry liquid. The mixture was stirred for 5 minutes and then dehydrated under pressure.

The obtained dehydrated cake was dried and then pulverized to afford about 2 kg of surface-treated calcium carbonate.

Example 2

A surface-treated calcium carbonate was obtained in the same manner as in Example 1 except that a synthetic calcium carbonate having a BET specific surface area of 17.9 $m^2/g$ was used and 40 g of mixed fatty acid sodium salt in which 16 g of sodium palmitate and 24 g of sodium stearate (14.7 g of palmitic acid and 22.3 g of stearic acid in terms of acid) were mixed was added.

Example 3

A surface-treated calcium carbonate was obtained in the same manner as in Example 1 except that 46 g of mixed fatty acid sodium salt in which 18.4 g of sodium palmitate and 27.6 g of sodium stearate (16.9 g of palmitic acid and 25.6 g of stearic acid in terms of acid) were mixed was added.

Example 4

A surface-treated calcium carbonate was obtained in the same manner as in Example 1 except that 58 g of mixed fatty acid sodium salt in which 23.2 g of sodium palmitate and 34.8 g of sodium stearate (21.4 g of palmitic acid and 32.3 g of stearic acid in terms of acid) were mixed was added.

Example 5

A surface-treated calcium carbonate was obtained in the same manner as in Example 1 except that a synthetic calcium carbonate having a BET specific surface area of 28.3 $m^2/g$ was used and 68 g of mixed fatty acid sodium salt in which 27.2 g of sodium palmitate and 40.8 g of sodium stearate (25.1 g of palmitic acid and 37.9 g of stearic acid in terms of acid) were mixed was added.

Example 6

A surface-treated calcium carbonate was obtained in the same manner as in Example 1 except that a synthetic calcium carbonate having a BET specific surface area of 35.1 $m^2/g$ was used and 86 g of mixed fatty acid sodium salt in which 34.4 g of sodium palmitate and 51.6 g of sodium stearate (31.7 g of palmitic acid and 47.9 g of stearic acid in terms of acid) were mixed was added.

Example 7

A surface-treated calcium carbonate was obtained in the same manner as in Example 1 except that 53.6 g of mixed fatty acid sodium salt in which 1 g of sodium laurate, 1 g of sodium myristate, 19.4 g of sodium palmitate, 30.2 g of sodium stearate, and 2 g of sodium oleate (0.9 g of lauric acid, 0.9 g of myristic acid, 17.9 g of palmitic acid, 28.0 g of stearic acid, and 1.9 g of oleic acid in terms of acid) were mixed was added.

Example 8

A surface-treated calcium carbonate was obtained in the same manner as in Example 1 except that 54 g of mixed fatty acid sodium salt in which 16.2 g of sodium palmitate and 37.8 g of sodium stearate (14.9 g of palmitic acid and 35.1 g of stearic acid in terms of acid) were mixed was used.

Example 9

A surface-treated calcium carbonate was obtained in the same manner as in Example 1 except that 54 g of mixed fatty acid sodium salt in which 27 g of sodium palmitate and 27 g of sodium stearate (24.9 g of palmitic acid and 25.1 g of stearic acid in terms of acid) were mixed was used.

Example 10

A surface-treated calcium carbonate was obtained in the same manner as in Example 1 except that 53.8 g of mixed fatty acid sodium salt in which 1 g of sodium laurate, 25.9 g of sodium palmitate, 25.4 g of sodium stearate, and 1.5 g of sodium oleate (0.9 g of lauric acid, 23.9 g of palmitic acid, 23.6 g of stearic acid, and 1.4 g of oleic acid in terms of acid) were mixed was used.

Example 11

A surface-treated calcium carbonate was obtained in the same manner as in Example 1 except that 54 g of mixed fatty acid sodium salt in which 1.1 g of sodium laurate, 12.4 g of sodium palmitate, 38.9 g of sodium stearate, and 1.6 g of sodium oleate (1.0 g of lauric acid, 11.4 g of palmitic acid, 35.9 g of stearic acid, and 1.5 g of oleic acid in terms of acid) were mixed was used.

Comparative Example 1

A surface-treated calcium carbonate was obtained in the same manner as in Example 1 except that 40 g of mixed fatty acid sodium salt in which 16 g of sodium palmitate and 24 g of sodium stearate (14.7 g of palmitic acid and 22.3 g of stearic acid in terms of acid) were mixed was added.

Comparative Example 2

A surface-treated calcium carbonate was obtained in the same manner as in Example 1 except that 62 g of mixed fatty acid sodium salt in which 24.8 g of sodium palmitate and 37.2 g of sodium stearate (22.8 g of palmitic acid and 34.5 g of stearic acid in terms of acid) were mixed was added.

Comparative Example 3

A surface-treated calcium carbonate was obtained in the same manner as in Example 1 except that a synthetic calcium carbonate having a BET specific surface area of 15.3 $m^2/g$ was used and 38 g of mixed fatty acid sodium salt in which 15.2 g of sodium palmitate and 22.8 g of sodium stearate (14.0 g of palmitic acid and 21.2 g of stearic acid in terms of acid) were mixed was added.

Comparative Example 4

A surface-treated calcium carbonate was obtained in the same manner as in Example 1 except that 54 g of mixed fatty acid sodium salt in which 8.1 g of sodium laurate, 16.2 g of sodium palmitate, and 29.7 g of sodium stearate (7.3 g of lauric acid, 14.9 g of palmitic acid, and 27.6 g of stearic acid in terms of acid) were mixed was added.

Comparative Example 5

A surface-treated calcium carbonate was obtained in the same manner as in Example 1 except that 54 g of mixed fatty acid sodium salt in which 16.2 g of sodium palmitate, 29.7 g of sodium stearate, and 8.1 g of sodium oleate (14.9 g of palmitic acid, 27.6 g of stearic acid, and 7.5 g of oleic acid in terms of acid) were mixed was added.

Comparative Example 6

A surface-treated calcium carbonate was obtained in the same manner as in Example 1 except that 54 g of mixed fatty acid sodium salt in which 10.8 g of sodium palmitate and 43.2 g of sodium stearate (9.9 g of palmitic acid and 40.1 g of stearic acid in terms of acid) were mixed was added.

Comparative Example 7

A surface-treated calcium carbonate was obtained in the same manner as in Example 1 except that 54 g of mixed fatty acid sodium salt in which 29.7 g of sodium palmitate and 24.3 g of sodium stearate (27.4 g of palmitic acid and 22.6 g of stearic acid in terms of acid) were mixed was added.

Comparative Example 8

A surface-treated calcium carbonate was obtained in the same manner as in Example 1 except that a synthetic calcium carbonate having a BET specific surface area of 50.3 $m^2/g$ was used and 126 g of mixed fatty acid sodium salt in which 50.4 g of sodium palmitate and 75.6 g of sodium stearate (46.4 g of palmitic acid and 70.2 g of stearic acid in terms of acid) were mixed was added.

Comparative Example 9

In the present comparative example, the surface treatment was performed using fatty acids and an emulsifier without using a sodium salt of a fatty acid.

A surface-treated calcium carbonate was obtained in the same manner as in Example 1 except that 50 g of mixed fatty acid in which 19.9 g of palmitic acid and 30.1 g of stearic acid were mixed and 0.8 g of dodecylbenzenesulfonic acid as an emulsifier were used.

Comparative Example 10

In the present comparative example, without using a sodium salt of a fatty acid, fatty acids were melted in a dry-process and applied onto the surface of calcium carbonate. The kneader used was a commonly used Henschel Mixer, the melting temperature was 100° C., and the kneading time was 15 minutes. The surface treatment was performed using 50 g of mixed fatty acid in which 19.9 g of palmitic acid and 30.1 g of stearic acid were mixed.

[Determination of BET Specific Surface Area]

The BET specific surface area of each calcium carbonate was determined before and after the surface treatment. The BET specific surface area was determined using a specific surface area analyzer FlowSorb II 2300 (manufactured by Micromeritics Instrument Corporation). The analysis results are shown in Table 1.

[Determination of Treating Agent Extraction Amount]

The treating agent extraction amount of each surface-treated calcium carbonate of Examples 1 to 11 and Comparative Examples 1 to 10 was determined. In a Soxhlet extractor, 15 g of surface-treated calcium carbonate was added, and isolated fatty acids and isolated salts of fatty acids in the surface-treated calcium carbonate were extracted with 100 ml of diethyl ether. The treating agent extraction amount was calculated from the change in weight of the surface-treated calcium carbonate before and after the extraction and the sample weight of the surface-treated calcium carbonate. The obtained results are shown in Table 1.

The amount (FA) of sodium salts or potassium salts of fatty acids used for the treatment in terms of acid based on 100 parts by weight of calcium carbonate, the ratio (FA/$SA_2$) of the treatment amount (FA) to the BET specific surface area ($SA_2$) of a surface-treated calcium carbonate, and the amount of the sodium salt or the potassium salt of each fatty acid in a surface treating agent in terms of acid are shown in Table 1.

The amount (FA) of fatty acids used for the treatment and the amount of the sodium salt or the potassium salt of each fatty acid in a surface treating agent in terms of acid were calculated by converting the amount of the sodium salt of each fatty acid used for the synthesis of the surface-treated calcium carbonate into the amount in terms of acid. In Comparative Example 9 and Comparative Example 10, a sodium salt or a potassium salt of a fatty acid was not used and each fatty acid was used in an acid form. Accordingly, each of FA and $FA/SA_2$ is 0. Each number in parentheses shown in Table 1 is a value of FA that is the amount of fatty acids used for the surface treatment and is shown for comparison with other Examples and Comparative Examples.

In the present invention, FA and the amount of each fatty acid may be calculated by acid treating a surface-treated calcium carbonate with hydrochloric acid or the like for degradation and then extracting the fatty acids isolated by degradation.

TABLE 1

| | | Example 1 | Example 2 | Example 3 | Example 4 | Example 5 | Example 6 | Example 7 |
|---|---|---|---|---|---|---|---|---|
| BET specific surface area ($m^2/g$) | Before surface treatment: $SA_1$ | 22.2 | 17.9 | 22.2 | 22.2 | 28.3 | 35.1 | 22.2 |
| | After surface treatment: $SA_2$ | 20.8 | 16.9 | 21.3 | 20.9 | 25.7 | 32.8 | 21.2 |
| Amount of fatty acid used for treatment: FA (parts by weight) | | 2.39 | 1.85 | 2.13 | 2.68 | 3.15 | 3.98 | 2.48 |
| $FA/SA_2$ | | 0.115 | 0.110 | 0.100 | 0.120 | 0.122 | 0.121 | 0.117 |
| Lauric acid (%) | | 0.0 | 0.0 | 0.0 | 0.0 | 0.0 | 0.0 | 1.9 |
| Myristic acid (%) | | 0.0 | 0.0 | 0.0 | 0.0 | 0.0 | 0.0 | 2.0 |
| Palmitic acid (%) | | 39.8 | 39.8 | 39.8 | 39.8 | 39.8 | 39.8 | 35.9 |
| Stearic acid (%) | | 60.2 | 60.2 | 60.2 | 60.2 | 60.2 | 60.2 | 56.2 |
| Oleic acid (%) | | 0.0 | 0.0 | 0.0 | 0.0 | 0.0 | 0.0 | 4.0 |
| PW + SW | | 100.0 | 100.0 | 100.0 | 100.0 | 100.0 | 100.0 | 92.1 |
| PW/SW | | 0.66 | 0.66 | 0.66 | 0.66 | 0.66 | 0.66 | 0.64 |
| Emulsifier (%) | | 0 | 0 | 0 | 0 | 0 | 0 | 0 |
| Treating agent extraction amount (%) | | 0.05 | 0.07 | 0.06 | 0.06 | 0.07 | 0.04 | 0.09 |

| | | Example 8 | Example 9 | Example 10 | Example 11 | Comparative Example 1 | Comparative Example 2 | Comparative Example 3 |
|---|---|---|---|---|---|---|---|---|
| BET specific surface area ($m^2/g$) | Before surface treatment: $SA_1$ | 22.2 | 22.2 | 22.2 | 22.2 | 22.2 | 22.2 | 15.3 |
| | After surface treatment: $SA_2$ | 20.8 | 21.3 | 21.3 | 20.8 | 21.0 | 20.5 | 14.4 |
| Amount of fatty acid used for treatment: FA (parts by weight) | | 2.50 | 2.50 | 2.49 | 2.49 | 1.85 | 2.87 | 1.76 |
| $FA/SA_2$ | | 0.120 | 0.117 | 0.117 | 0.120 | 0.088 | 0.140 | 0.122 |
| Lauric acid (%) | | 0.0 | 0.0 | 1.9 | 1.9 | 0.0 | 0.0 | 0.0 |
| Myristic acid (%) | | 0.0 | 0.0 | 0.0 | 0.0 | 0.0 | 0.0 | 0.0 |
| Palmitic acid (%) | | 29.8 | 49.8 | 47.8 | 22.9 | 39.8 | 39.8 | 39.8 |
| Stearic acid (%) | | 70.2 | 50.2 | 47.2 | 72.2 | 60.2 | 60.2 | 60.2 |
| Oleic acid (%) | | 0.0 | 0.0 | 3.0 | 3.0 | 0.0 | 0.0 | 0.0 |
| PW + SW | | 100.0 | 100.0 | 95.0 | 95.1 | 100.0 | 100.0 | 100.0 |
| PW/SW | | 0.43 | 0.99 | 1.01 | 0.32 | 0.66 | 0.66 | 0.66 |
| Emulsifier (%) | | 0 | 0 | 0 | 0 | 0 | 0 | 0 |
| Treating agent extraction amount (%) | | 0.04 | 0.05 | 0.09 | 0.09 | 0.08 | 0.11 | 0.04 |

| | | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|
| BET specific surface area ($m^2/g$) | Before surface treatment: $SA_1$ | 22.2 | 22.2 | 22.2 | 22.2 | 50.3 | 22.2 | 22.2 |
| | After surface treatment: $SA_2$ | 20.9 | 21.1 | 21.1 | 21.2 | 48.4 | 21.0 | 20.2 |
| Amount of fatty acid used for treatment: FA (parts by weight) | | 2.49 | 2.50 | 2.50 | 2.50 | 5.83 | (2.50) | (2.50) |
| $FA/SA_2$ | | 0.119 | 0.118 | 0.119 | 0.118 | 0.120 | (0.119) | (0.124) |
| Lauric acid (%) | | 14.7 | 0.0 | 0.0 | 0.0 | 0.0 | 0.0 | 0.0 |
| Myristic acid (%) | | 0.0 | 0.0 | 0.0 | 0.0 | 0.0 | 0.0 | 0.0 |
| Palmitic acid (%) | | 30.0 | 29.8 | 19.9 | 54.8 | 39.8 | 39.8 | 39.8 |
| Stearic acid (%) | | 55.4 | 55.1 | 80.1 | 45.2 | 60.2 | 60.2 | 60.2 |
| Oleic acid (%) | | 0.0 | 15.0 | 0.0 | 0.0 | 0.0 | 0.0 | 0.0 |
| PW + SW | | 85.4 | 84.9 | 100.0 | 100.0 | 100.0 | 100.0 | 100.0 |
| PW/SW | | 0.54 | 0.54 | 0.25 | 1.21 | 0.66 | 0.66 | 0.66 |
| Emulsifier (%) | | 0 | 0 | 0 | 0 | 0 | 0.04 | 0 |
| Treating agent extraction amount (%) | | 0.13 | 0.32 | 0.05 | 0.09 | 0.04 | 0.12 | 0.28 |

In Comparative Examples 1 and 2, each value of FA/SA$_2$ was out of the range defined in the present invention.

In Comparative Examples 3 and 8, each BET specific surface area after the surface treatment was out of the range defined in the present invention.

In Comparative Examples 4 and 5, each value of PW+SW was out of the range defined in the present invention.

In Comparative Examples 6 and 7, each value of PW/SW was out of the range defined in the present invention.

In Comparative Example 9, fatty acids in acid forms and an emulsifier were used. The treating agent extraction amount was more than 0.1% by weight. The treating agent extraction amount was also more than 0.1% by weight in each of Comparative Example 2, Comparative Example 4, and Comparative Example 5.

In Comparative Example 10, without using a sodium salt or a potassium salt of a fatty acid, the surface of calcium carbonate was treated with fatty acids in a dry-process, and the treating agent extraction amount was more than 0.1% by weight.

<Viscosity Test of PPG Sol>

The viscosity of a PPG (polypropylene glycol) sol containing each surface-treated calcium carbonate of Examples 1 to 11 and Comparative Examples 1 to 10 was determined. The PPG sol was prepared by thoroughly kneading 100 g of surface-treated calcium carbonate and 100 g of PPG (trade name "EXCENOL 3020" manufactured by ASAHI GLASS CO., LTD.), and the viscosity of the obtained PPG sol was determined at the initial state and after 7 days in a similar manner to the above. The test results are shown in Table 2.

TABLE 2

|  | Example 1 | Example 2 | Example 3 | Example 4 | Example 5 | Example 6 | Example 7 |
|---|---|---|---|---|---|---|---|
| Immediately after kneading |  |  |  |  |  |  |  |
| 2 rpm (Pa·s) | 520 | 428 | 476 | 612 | 478 | 448 | 550 |
| 20 rpm (Pa·s) | 80 | 64 | 72 | 90 | 76 | 70 | 82 |
| 2 rpm/20 rpm | 6.5 | 6.7 | 6.6 | 6.8 | 6.3 | 6.4 | 6.7 |
| After 7 days |  |  |  |  |  |  |  |
| 2 rpm (Pa·s) | 550 | 442 | 510 | 620 | 520 | 498 | 552 |
| 20 rpm (Pa·s) | 84 | 66 | 78 | 92 | 82 | 80 | 84 |
| 2 rpm/20 rpm | 6.5 | 6.7 | 6.5 | 6.8 | 6.3 | 6.2 | 6.6 |
| Rate of change in viscosity |  |  |  |  |  |  |  |
| 2 rpm (%) | 106 | 103 | 107 | 102 | 109 | 111 | 100 |
| 20 rpm (%) | 105 | 103 | 108 | 103 | 109 | 113 | 102 |

|  | Example 8 | Example 9 | Example 10 | Example 11 | Comparative Example 1 | Comparative Example 2 | Comparative Example 3 |
|---|---|---|---|---|---|---|---|
| Immediately after kneading |  |  |  |  |  |  |  |
| 2 rpm (Pa·s) | 484 | 456 | 512 | 546 | 412 | 578 | 420 |
| 20 rpm (Pa·s) | 82 | 66 | 74 | 80 | 100 | 86 | 94 |
| 2 rpm/20 rpm | 5.9 | 6.9 | 7.0 | 6.8 | 4.1 | 6.7 | 4.5 |
| After 7 days |  |  |  |  |  |  |  |
| 2 rpm (Pa·s) | 518 | 468 | 522 | 556 | 436 | 566 | 450 |
| 20 rpm (Pa·s) | 88 | 68 | 74 | 82 | 174 | 86 | 100 |
| 2 rpm/20 rpm | 5.9 | 6.7 | 7.1 | 6.8 | 2.5 | 6.6 | 4.5 |
| Rate of change in viscosity |  |  |  |  |  |  |  |
| 2 rpm (%) | 107 | 102 | 102 | 102 | 106 | 98 | 107 |
| 20 rpm (%) | 107 | 103 | 101 | 103 | 174 | 99 | 106 |

|  | Comparative Example 4 | Comparative Example 5 | Comparative Example 6 | Comparative Example 7 | Comparative Example 8 | Comparative Example 9 | Comparative Example 10 |
|---|---|---|---|---|---|---|---|
| Immediately after kneading |  |  |  |  |  |  |  |
| 2 rpm (Pa·s) | 478 | 598 | 512 | 466 | 126 | 480 | 118 |
| 20 rpm (Pa·s) | 68 | 80 | 104 | 96 | 34 | 72 | 28 |
| 2 rpm/20 rpm | 7.0 | 7.5 | 4.9 | 4.9 | 3.7 | 6.6 | 4.2 |
| After 7 days |  |  |  |  |  |  |  |
| 2 rpm (Pa·s) | 474 | 586 | 522 | 480 | 184 | 548 | 148 |
| 20 rpm (Pa·s) | 66 | 78 | 108 | 100 | 62 | 84 | 36 |
| 2 rpm/20 rpm | 7.2 | 7.5 | 4.8 | 4.8 | 3.0 | 6.5 | 4.1 |
| Rate of change in viscosity |  |  |  |  |  |  |  |
| 2 rpm (%) | 99 | 98 | 102 | 103 | 146 | 114 | 125 |
| 20 rpm (%) | 98 | 97 | 103 | 104 | 180 | 117 | 129 |

As apparent from Table 2, it is revealed that the PPG sol using each surface-treated calcium carbonate of Examples 1 to 11 in accordance with the present invention exhibited high viscosity and good thixotropic properties. It is revealed that each PPG sol also had excellent storage stability.

In Comparative Example 1, the amount of fatty acids used for treatment was low with respect to the calcium carbonate surface. It is supposed that this led to strong aggregation of calcium carbonate particles and hence the calcium carbonate particles were not thoroughly dispersed. As a result, the viscosity was low and the storage stability was poor (viscosity ratio was largely increased).

In Comparative Example 3, the particle size was small to lead to small surface area per unit weight of calcium carbonate, and the ratio of thixotropic factors: 2 rpm/20 rpm was reduced. Therefore, enough thixotropic properties were not imparted.

In Comparative Examples 6 and 7, one fatty acid was included in a large amount and was supposed to be readily crystallized in the same fatty acid. Hence, it is considered that the calcium carbonate surface was not homogeneously treated with such a fatty acid. It is supposed that this affected each Comparative Example to result in low thixotropic properties.

In Comparative Example 8, the particles had an excessively small size. It is supposed that this led to strong aggregation and hence the particles were not thoroughly dispersed to lead to low viscosity.

In Comparative Example 9, a fatty acid was not saponified to be a metal salt but an emulsifier was used for the treatment of the calcium carbonate surface. However, the surface was not homogeneously treated to lead to poor storage stability.

In Comparative Example 10, the calcium carbonate was surface treated with fatty acids in a dry-process, but it is supposed that the treatment was not homogeneous to result in low viscosity, poor thixotropic properties, and poor storage stability.

Here, Comparative Examples 2, 4, and 5 showed good results. However, in the tensile strength and the adhesion properties examined in the following applied physical test, corresponding resin cured products did not show good results. This is supposed to be because fatty acids isolated from the surface, so-called isolated fatty acids were present in large amounts.

<Viscosity and Tensile Tests of Two-Pack Polyurethane Sealant>

From each surface-treated calcium carbonate of Examples 1 to 11 and Comparative Examples 1 to 10, a two-pack polyurethane sealant was prepared, and two components were mixed and subjected to viscosity measurement. The two-pack polyurethane sealant was prepared as follows: as a curing agent, 100 g of HAKUENKA CC-R (manufactured by Shiraishi Kogyo Kaisha, Ltd.), 60 g of PPG (trade name "ACTCOL 87-34" manufactured by Mitsui Chemicals Polyurethanes Inc.), 40 g of PPG (trade name "ACTCOL SHP-2550" manufactured by Mitsui Chemicals Polyurethanes Inc.), 120 g of heavy calcium carbonate (trade name "Whiton P-30" manufactured by Toyo Fine Chemical Co., Ltd.), and 15 g of lead octoate (manufactured by Kishida Chemical Co., Ltd.) were thoroughly kneaded for preparation; and then 80 g of the curing agent and 20 g of urethane prepolymer (trade name "TAKENATE L-1032" manufactured by Mitsui Chemicals Polyurethanes Inc.) were thoroughly kneading for preparation. The initial viscosity of the obtained two-pack polyurethane sealant and the viscosity of the two-pack polyurethane sealant mixed after 14 days were determined in a similar manner to the above. The test results are shown in Table 4. The tensile strength was measured as follows: aluminum plates were used as an adherend; two aluminum plates were disposed so as to make a space of (12±0.3)×(12±0.3)×(50±0.6) mm; a sealant was fill up in the space; the sealant was cured at 23±2° C. and (50±5) % RH for 7 days, and then cured at 30±2° C. for 7 days; and the tensile properties were determined.

TABLE 3

|  | Example 1 | Example 2 | Example 3 | Example 4 | Example 5 | Example 6 | Example 7 |
| --- | --- | --- | --- | --- | --- | --- | --- |
| Immediately after kneading |  |  |  |  |  |  |  |
| 1 rpm (Pa · s) | 3560 | 3020 | 3460 | 3810 | 3790 | 4210 | 3670 |
| 10 rpm (Pa · s) | 584 | 504 | 577 | 625 | 621 | 679 | 592 |
| 1 rpm/10 rpm | 6.1 | 6.0 | 6.0 | 6.1 | 6.1 | 6.2 | 6.2 |
| After 14 days |  |  |  |  |  |  |  |
| 1 rpm (Pa · s) | 3740 | 3140 | 3560 | 3890 | 3940 | 4500 | 3743 |
| 10 rpm (Pa · s) | 607 | 534 | 594 | 638 | 652 | 719 | 610 |
| 1 rpm/10 rpm | 6.2 | 5.8 | 6.0 | 6.1 | 6.0 | 6.3 | 6.1 |
| Rate of change in viscosity |  |  |  |  |  |  |  |
| 1 rpm (%) | 105 | 104 | 103 | 102 | 104 | 107 | 102 |
| 10 rpm (%) | 104 | 106 | 103 | 102 | 105 | 106 | 103 |
| Tensile strength (N/mm$^2$) | 1.74 | 1.56 | 1.70 | 1.61 | 1.78 | 1.80 | 1.51 |

|  | Example 8 | Example 9 | Example 10 | Example 11 | Comparative Example 1 | Comparative Example 2 | Comparative Example 3 |
| --- | --- | --- | --- | --- | --- | --- | --- |
| Immediately after kneading |  |  |  |  |  |  |  |
| 1 rpm (Pa · s) | 3670 | 3770 | 3890 | 3590 | 2550 | 3570 | 2100 |
| 10 rpm (Pa · s) | 622 | 639 | 638 | 598 | 440 | 576 | 351 |
| 1 rpm/10 rpm | 5.9 | 5.9 | 6.1 | 6.0 | 5.8 | 62.0 | 6.0 |
| After 30 days |  |  |  |  |  |  |  |
| 1 rpm (Pa · s) | 3820 | 3960 | 3970 | 3730 | 3390 | 3600 | 2180 |
| 10 rpm (Pa · s) | 659 | 684 | 651 | 622 | 638 | 582 | 360 |
| 1 rpm/10 rpm | 5.9 | 5.8 | 6.1 | 6.0 | 5.3 | 6.2 | 6.1 |

TABLE 3-continued

| Rate of change in viscosity | | | | | | | |
|---|---|---|---|---|---|---|---|
| 1 rpm (%) | 104 | 105 | 102 | 104 | 133 | 101 | 104 |
| 10 rpm (%) | 106 | 107 | 102 | 104 | 145 | 101 | 103 |
| Tensile strength (N/mm$^2$) | 1.73 | 1.77 | 1.58 | 1.67 | 1.51 | 1.23 | 1.25 |

| | Comparative Example 4 | Comparative Example 5 | Comparative Example 6 | Comparative Example 7 | Comparative Example 8 | Comparative Example 9 | Comparative Example 10 |
|---|---|---|---|---|---|---|---|
| Immediately after kneading | | | | | | | |
| 1 rpm (Pa · s) | 2350 | 3950 | 3760 | 3660 | 1110 | 2150 | 1250 |
| 10 rpm (Pa · s) | 385 | 637 | 783 | 747 | 264 | 439 | 431 |
| 1 rpm/10 rpm | 6.1 | 6.2 | 4.8 | 4.9 | 4.2 | 4.9 | 2.9 |
| After 30 days | | | | | | | |
| 1 rpm (Pa · s) | 2400 | 3990 | 3990 | 3840 | 1730 | 2620 | 2340 |
| 10 rpm (Pa · s) | 397 | 643 | 846 | 784 | 422 | 549 | 629 |
| 1 rpm/10 rpm | 6.0 | 6.2 | 4.7 | 4.9 | 4.1 | 4.8 | 3.3 |
| Rate of change in viscosity | | | | | | | |
| 1 rpm (%) | 102 | 101 | 106 | 105 | 156 | 122 | 187 |
| 10 rpm (%) | 103 | 101 | 108 | 105 | 160 | 125 | 146 |
| Tensile strength (N/mm$^2$) | 1.18 | 1.09 | 1.69 | 1.68 | 1.06 | 1.10 | 0.97 |

As apparent from Table 3, it is revealed that the two-pack polyurethane sealant using each surface-treated calcium carbonate of Examples 1 to 11 in accordance with the present invention exhibited high viscosity and good thixotropic properties and a corresponding cured product showed good physical quality.

In Comparative Example 1, the amount of fatty acids used for treatment was small with respect to the calcium carbonate surface, and it is supposed that the calcium carbonate particles were not thoroughly dispersed due to the aggregation of the particles. This is supposed to result in low viscosity, low thixotropic properties, and poor storage stability.

In Comparative Example 2, the amount of fatty acids used for treatment was large with respect to the calcium carbonate surface, and it is supposed that excess fatty acids that were not used for the treatment remained on the calcium carbonate surface to increase the treating agent extraction amount. As a result, it is supposed that isolated fatty acids migrated between the adherend and the resin interface to interfere with the adhesion.

In Comparative Example 3, as with the result in PPG, it is supposed that the particle size was small to lead to small surface area per unit weight of calcium carbonate and hence enough thixotropic properties were not imparted.

In Comparative Examples 4 and 5, the treating agent extraction amount was large. This is supposed to be because lauric acid having a low molecular weight and oleic acid as an unsaturated fatty acid are unlikely to adsorb to the calcium carbonate surface as compared with palmitic acid and stearic acid. As a result, as with Comparative Example 2, it is supposed that isolated fatty acids interfered with resin adhesion to reduce the tensile strength.

In Comparative Examples 6 and 7, as with in PPG, one fatty acid was included in a large amount and was supposed to be readily crystallized in the same fatty acid. Hence, it is supposed that the calcium carbonate surface was not homogeneously treated to result in low thixotropic properties.

In Comparative Example 8, the particles had an excessively small size. Hence, it is supposed that the particles were strongly aggregated and were not thoroughly dispersed to result in low viscosity, low thixotropic properties, and poor storage stability.

In Comparative Example 9, a fatty acid was not saponified to be a metal salt but an emulsifier was used for the surface treatment of calcium carbonate. However, it is supposed that the surface was not homogeneously treated to adversely affect storage stability and tensile strength of the cured product.

In Comparative Example 10, the calcium carbonate was treated with fatty acids in a dry-process. Hence, it is supposed that the surface condition was not homogeneous to result in low viscosity, poor thixotropic properties, and poor storage stability.

<Viscosity and Tensile Tests of Two-Pack Polysulfide Sealant>

From each surface-treated calcium carbonate of Examples 1 to 11 and Comparative Examples 1 to 10, a two-pack polysulfide sealant was prepared and subjected to viscosity measurement. The two-pack polysulfide sealant was prepared as follows: as a base material, 40 g of HAKUENKA CC-R (manufactured by Shiraishi Kogyo Kaisha, Ltd.), 100 g of polysulfide polymer (trade name "THIOKOL LP23" manufactured by Toray Fine Chemicals Co., Ltd.), 150 g of heavy calcium carbonate (trade name "Whiton 305" manufactured by Toyo Fine Chemical Co., Ltd.), 40 g of BBP, sulfur (reagent grade manufactured by Wako Pure Chemical Industries, Ltd.), and 2 g of epoxysilane (trade name "Z-6040" manufactured by Dow Corning Toray Co., Ltd.) were thoroughly kneaded; as a curing agent, 10 g of manganese oxide (trade name "THIOBROWN S-7" manufactured by Nihon Kagaku Sangyo Co., Ltd.), 15 g of BBP (trade name "Diasizer D160" manufactured by Mitsubishi Chemical Corporation), 6 g of carbon black (trade name "SRF-L #35" manufactured by Asahi Carbon Co., Ltd.), and 0.5 g of tetramethylthiuram disulfide (trade name "NOCCELER TT-P" manufactured by Ouchi Shinko Chemical Industrial Co., Ltd.) were thoroughly kneaded; and with respect to 100 g of the base material, 10 g of the curing agent was thoroughly kneaded for the preparation. The initial viscosity of the obtained two-pack polysulfide sealant and the viscosity of the two-pack polysulfide sealant mixed after 14 days were determined in a similar manner to the above. The test results are shown in Table 4. The tensile strength was measured as follows: aluminum plates were used as an adherend; two aluminum plates were disposed so as to make a space of (12±0.3)×(12±0.3)×(50±0.6)

mm; a sealant was fill up in the space; the sealant was cured at 23±2° C. and (50±5) % RH for 7 days, and then cured at 30±2° C. for 7 days; and the tensile properties were determined.

of modified silicone polymer (trade name "MS Polymer 5203" manufactured by Kaneka Corporation), 50 g of DINP, 50 g of heavy calcium carbonate (trade name "Whiton 305"

TABLE 4

|  | Example 1 | Example 2 | Example 3 | Example 4 | Example 5 | Example 6 | Example 7 |
|---|---|---|---|---|---|---|---|
| Immediately after kneading |  |  |  |  |  |  |  |
| 1 rpm (Pa · s) | 2680 | 2370 | 2400 | 2890 | 2800 | 2380 | 2850 |
| 10 rpm (Pa · s) | 455 | 395 | 414 | 474 | 475 | 410 | 460 |
| 1 rpm/10 rpm | 5.9 | 6.0 | 5.8 | 6.1 | 5.9 | 5.8 | 6.2 |
| After 30 days |  |  |  |  |  |  |  |
| 1 rpm (Pa · s) | 2700 | 2390 | 2500 | 2980 | 2970 | 2550 | 2910 |
| 10 rpm (Pa · s) | 474 | 407 | 435 | 483 | 504 | 443 | 474 |
| 1 rpm/10 rpm | 5.7 | 5.8 | 5.7 | 6.2 | 5.9 | 5.8 | 6.1 |
| Rate of change in viscosity |  |  |  |  |  |  |  |
| 1 rpm (%) | 101 | 101 | 104 | 103 | 106 | 107 | 102 |
| 10 rpm (%) | 104 | 103 | 105 | 102 | 106 | 108 | 103 |
| Tensile strength (N/mm$^2$) | 0.82 | 0.80 | 0.85 | 0.80 | 0.91 | 0.80 | 0.80 |

|  | Example 8 | Example 9 | Example 10 | Example 11 | Comparative Example 1 | Comparative Example 2 | Comparative Example 3 |
|---|---|---|---|---|---|---|---|
| Immediately after kneading |  |  |  |  |  |  |  |
| 1 rpm (Pa · s) | 2660 | 2650 | 2790 | 2930 | 2050 | 3010 | 2120 |
| 10 rpm (Pa · s) | 451 | 449 | 465 | 488 | 427 | 502 | 359 |
| 1 rpm/10 rpm | 5.9 | 5.9 | 6.0 | 6.0 | 4.8 | 6.0 | 5.9 |
| After 30 days |  |  |  |  |  |  |  |
| 1 rpm (Pa · s) | 2690 | 2700 | 2850 | 2990 | 2990 | 3040 | 2162 |
| 10 rpm (Pa · s) | 465 | 462 | 470 | 498 | 645 | 500 | 363 |
| 1 rpm/10 rpm | 5.9 | 5.8 | 6.1 | 6.0 | 4.6 | 6.1 | 6.0 |
| Rate of change in viscosity |  |  |  |  |  |  |  |
| 1 rpm (%) | 101 | 102 | 102 | 102 | 146 | 101 | 102 |
| 10 rpm (%) | 103 | 103 | 101 | 102 | 151 | 100 | 101 |
| Tensile strength (N/mm$^2$) | 0.80 | 0.81 | 0.81 | 0.80 | 0.70 | 0.67 | 0.69 |

|  | Comparative Example 4 | Comparative Example 5 | Comparative Example 6 | Comparative Example 7 | Comparative Example 8 | Comparative Example 9 | Comparative Example 10 |
|---|---|---|---|---|---|---|---|
| Immediately after kneading |  |  |  |  |  |  |  |
| 1 rpm (Pa · s) | 2110 | 3150 | 2760 | 2860 | 1250 | 2450 | 1350 |
| 10 rpm (Pa · s) | 368 | 508 | 563 | 584 | 291 | 500 | 435 |
| 1 rpm/10 rpm | 6.0 | 6.2 | 4.9 | 4.9 | 4.3 | 4.9 | 3.1 |
| After 30 days |  |  |  |  |  |  |  |
| 1 rpm (Pa · s) | 2170 | 3210 | 2840 | 2950 | 2240 | 3310 | 2660 |
| 10 rpm (Pa · s) | 372 | 513 | 586 | 602 | 524 | 700 | 818 |
| 1 rpm/10 rpm | 5.8 | 6.3 | 4.8 | 4.9 | 4.3 | 4.7 | 3.3 |
| Rate of change in viscosity |  |  |  |  |  |  |  |
| 1 rpm (%) | 103 | 102 | 103 | 103 | 179 | 135 | 197 |
| 10 rpm (%) | 101 | 101 | 104 | 103 | 180 | 140 | 188 |
| Tensile strength (N/mm$^2$) | 0.68 | 0.59 | 0.69 | 0.68 | 0.36 | 0.50 | 0.47 |

As apparent from Table 4, the two-pack polysulfide sealant using each surface-treated calcium carbonate of Examples 1 to 11 in accordance with the present invention exhibited high viscosity and good fine thixotropic properties and a corresponding cured product showed good physical quality. The test results and the discussions are considered to be the same as those for the two-pack polyurethane sealant.

<Viscosity and Tensile Tests of One-Pack Modified Silicone Sealant>

From each surface-treated calcium carbonate of Examples 1 to 11 and Comparative Examples 1 to 10, a one-pack modified silicone sealant was prepared and subjected to viscosity measurement. The one-pack modified silicone sealant was prepared by thoroughly kneading 100 g of HAKUENKA CC-R (manufactured by Shiraishi Kogyo Kaisha, Ltd.), 100 g of modified silicone polymer (trade name "MS Polymer 5203" manufactured by Kaneka Corporation), 50 g of DINP, 50 g of heavy calcium carbonate (trade name "Whiton 305" manufactured by Toyo Fine Chemical Co., Ltd.), 3 g of titanium oxide (trade name "JR-600A" manufactured by Tayca Corporation), 2 g of fatty acid amide (trade name "A-S-AT-1800" manufactured by Itoh Oil Chemicals Co., Ltd.), 1 g of hindered amine stabilizer (trade name "TINUVIN 770DF" manufactured by Ciba Japan), 1 g of benzotriazole ultraviolet absorber (trade name "SEESORB 703" manufactured by Shipro Kasei Kaisha, Ltd.), 2 g of vinyltrimethoxysilane (trade name "KBM #1003" manufactured by Shin-Etsu Chemical Co., Ltd.), 2 g of aminopropyltriethoxysilane (trade name "KBM #603" manufactured by Shin-Etsu Chemical Co., Ltd.), and 0.25 g of catalyst (trade name "U-100" manufactured by Nitto Gosei Co., Ltd.). The initial viscosity and the viscosity after 14 days of the obtained one-pack modified silicone sealant were determined in a similar manner to the above. The test results are shown in Table 5. The tensile strength was measured as follows: aluminum plates were used as an adherend; two aluminum plates were disposed so as to make a space of (12±0.3)×(12±0.3)×(50±0.6) mm; a sealant was fill up in the space; the sealant was cured at 23±2° C. and (50±5) % RH for 14 days, and then cured at 30±2° C. for 14 days; and the tensile properties were determined.

prepared and subjected to viscosity measurement. The PVC plastisol was prepared by thoroughly kneading 60 g of HAKUENKA CC-R (manufactured by Shiraishi Kogyo Kaisha, Ltd.), 100 g of PVC resin (trade name "VESTOLIT P 1353K" manufactured by VESTOLIT GMBH), 140 g of DINP, 5 g of calcium oxide (trade name "CML #31" manufactured by Ohmi Chemical Industry Co., Ltd.), 15 g of min-

TABLE 5

| | Example 1 | Example 2 | Example 3 | Example 4 | Example 5 | Example 6 | Example 7 |
|---|---|---|---|---|---|---|---|
| Immediately after kneading | | | | | | | |
| 1 rpm (Pa·s) | 1940 | 1720 | 1880 | 2120 | 1990 | 1720 | 2210 |
| 10 rpm (Pa·s) | 325 | 282 | 324 | 337 | 337 | 297 | 351 |
| 1 rpm/10 rpm | 6.0 | 6.1 | 5.8 | 6.3 | 5.9 | 5.8 | 6.3 |
| After 14 days | | | | | | | |
| 1 rpm (Pa·s) | 1940 | 1740 | 1970 | 2160 | 2130 | 1870 | 2230 |
| 10 rpm (Pa·s) | 335 | 290 | 343 | 344 | 364 | 321 | 358 |
| 1 rpm/10 rpm | 5.8 | 6.0 | 5.7 | 6.3 | 5.9 | 5.8 | 6.2 |
| Rate of change in viscosity | | | | | | | |
| 1 rpm (%) | 100 | 101 | 105 | 102 | 107 | 109 | 101 |
| 10 rpm (%) | 103 | 103 | 106 | 102 | 108 | 108 | 102 |
| Tensile strength (N/mm$^2$) | 1.07 | 1.01 | 1.25 | 1.02 | 1.10 | 1.11 | 1.02 |

| | Example 8 | Example 9 | Example 10 | Example 11 | Comparative Example 1 | Comparative Example 2 | Comparative Example 3 |
|---|---|---|---|---|---|---|---|
| Immediately after kneading | | | | | | | |
| 2 rpm (Pa·s) | 1900 | 1820 | 1980 | 2020 | 1420 | 2350 | 1640 |
| 20 rpm (Pa·s) | 322 | 298 | 319 | 326 | 330 | 379 | 328 |
| 2 rpm/20 rpm | 5.9 | 6.1 | 6.1 | 6.2 | 4.3 | 6.2 | 5.0 |
| After 7 days | | | | | | | |
| 2 rpm (Pa·s) | 1920 | 1870 | 2000 | 2060 | 1510 | 2370 | 1670 |
| 20 rpm (Pa·s) | 328 | 304 | 322 | 329 | 498 | 375 | 335 |
| 2 rpm/20 rpm | 5.9 | 6.2 | 6.2 | 6.3 | 3.0 | 6.3 | 5.0 |
| Rate of change in viscosity | | | | | | | |
| 2 rpm (%) | 101 | 103 | 101 | 102 | 106 | 101 | 102 |
| 20 rpm (%) | 102 | 102 | 101 | 101 | 151 | 99 | 102 |
| Tensile strength (N/mm$^2$) | 1.05 | 1.06 | 1.00 | 1.01 | 0.85 | 0.88 | 0.94 |

| | Comparative Example 4 | Comparative Example 5 | Comparative Example 6 | Comparative Example 7 | Comparative Example 8 | Comparative Example 9 | Comparative Example 10 |
|---|---|---|---|---|---|---|---|
| Immediately after kneading | | | | | | | |
| 2 rpm (Pa·s) | 1390 | 2320 | 1890 | 1910 | 320 | 1690 | 350 |
| 20 rpm (Pa·s) | 217 | 362 | 393 | 390 | 102 | 307 | 110 |
| 2 rpm/20 rpm | 6.4 | 6.4 | 4.8 | 4.9 | 3.1 | 5.5 | 3.2 |
| After 7 days | | | | | | | |
| 2 rpm (Pa·s) | 1400 | 2340 | 1950 | 1950 | 400 | 1943 | 510 |
| 20 rpm (Pa·s) | 221 | 366 | 409 | 402 | 166 | 368 | 169 |
| 2 rpm/20 rpm | 6.3 | 6.4 | 4.8 | 4.9 | 2.4 | 5.3 | 3.0 |
| Rate of change in viscosity | | | | | | | |
| 2 rpm (%) | 101 | 101 | 103 | 102 | 126 | 115 | 146 |
| 20 rpm (%) | 102 | 101 | 104 | 103 | 163 | 120 | 154 |
| Tensile strength (N/mm$^2$) | 0.78 | 0.59 | 0.98 | 0.97 | 0.35 | 0.57 | 0.33 |

As apparent from Table 5, the one-pack modified silicone sealant using each surface-treated calcium carbonate of Examples 1 to 11 in accordance with the present invention exhibited high viscosity and good thixotropic properties and a corresponding cured product showed good physical quality. The test results and the discussions are considered to be the same as those for the two-pack polyurethane sealant and the two-pack sulfide sealant.

<Viscosity and Adhesion Tests of Polyvinyl Chloride Sol>

From each surface-treated calcium carbonate of Examples 1 to 7 and Comparative Examples 1 to 7, a PVC plastisol was eral terpene (trade name "MINERALTERPENE" manufactured by Yamakei Sangyo), and 6 g of polyamidoamine (trade name "Versamide 140" manufactured by Cognis Japan). The viscosity and the yield value of the obtained PVC plastisol were determined at the initial state and after 7 days using a precision rotational viscometer at a maximum shear velocity of 400 s$^{-1}$, an acceleration time of 2 minutes, a holding time of 3 minutes, and a deceleration time of 2 minutes. The high-shear viscosity is a viscosity when the shear velocity reached the maximum value and the yield value was calculated from the point where a line between the point at 400 s$^{-1}$ and the point at 6 s$^{-1}$ on the deceleration curve intersected the line of a shear velocity of 0 s$^{-1}$. For the adhesion properties, a sol was applied onto an electrodeposition coated plate so as to give a thickness of 3 mm, and heated at 140° C. for 30 minutes for curing the sol. The cured sol was bitten with a cutter, then peeled by hand, and evaluated on the basis of the criteria below. A cured product that remained on the plate at a ratio of 90% or more was evaluated as ○, a cured product that did not remain on the plate was evaluated as x, and other cured products were evaluated as Δ.

TABLE 6

|  | Example 1 | Example 2 | Example 3 | Example 4 | Example 5 | Example 6 | Example 7 |
|---|---|---|---|---|---|---|---|
| Yield value (Pa) | 256 | 223 | 245 | 269 | 258 | 221 | 245 |
| High-shear viscosity (Pa · s) | 2.3 | 2.2 | 2.4 | 2.4 | 2.4 | 2.2 | 2.2 |
| After 7 days |  |  |  |  |  |  |  |
| Yield value (Pa) | 249 | 217 | 228 | 247 | 248 | 216 | 234 |
| High-shear viscosity (Pa · s) | 2.3 | 2.3 | 2.5 | 2.5 | 2.5 | 2.3 | 2.3 |
| Rate of change in viscosity |  |  |  |  |  |  |  |
| Yield value (%) | 97 | 97 | 93 | 92 | 96 | 98 | 96 |
| High-shear viscosity (%) | 100 | 105 | 104 | 104 | 104 | 105 | 105 |
| Adhesion properties | ○ | ○ | ○ | ○ | ○ | ○ | ○ |

|  | Example 8 | Example 9 | Example 10 | Example 11 | Comparative Example 1 | Comparative Example 2 | Comparative Example 3 |
|---|---|---|---|---|---|---|---|
| Yield value (Pa) | 266 | 234 | 253 | 259 | 153 | 190 | 189 |
| High-shear viscosity (Pa · s) | 2.4 | 2.1 | 2.1 | 2.2 | 3.4 | 2.3 | 2.6 |
| After 7 days |  |  |  |  |  |  |  |
| Yield value (Pa) | 257 | 226 | 243 | 239 | 130 | 186 | 179 |
| High-shear viscosity (Pa · s) | 2.5 | 2.2 | 2.2 | 2.2 | 3.5 | 2.3 | 2.7 |
| Rate of change in viscosity |  |  |  |  |  |  |  |
| Yield value (%) | 97 | 97 | 96 | 92 | 85 | 98 | 95 |
| High-shear viscosity (%) | 104 | 105 | 105 | 100 | 103 | 100 | 104 |
| Adhesion properties | ○ | ○ | ○ | ○ | ○ | Δ | Δ |

|  | Comparative Example 4 | Comparative Example 5 | Comparative Example 6 | Comparative Example 7 | Comparative Example 8 | Comparative Example 9 | Comparative Example 10 |
|---|---|---|---|---|---|---|---|
| Yield value (Pa) | 143 | 139 | 250 | 230 | 98 | 120 | 62 |
| High-shear viscosity (Pa · s) | 1.9 | 1.7 | 3.5 | 3.1 | 2.6 | 2.5 | 4.6 |
| After 7 days |  |  |  |  |  |  |  |
| Yield value (Pa) | 138 | 130 | 236 | 227 | 87 | 101 | 79 |
| High-shear viscosity (Pa · s) | 2.0 | 1.8 | 3.5 | 3.2 | 3.2 | 2.8 | 4.8 |
| Rate of change in viscosity |  |  |  |  |  |  |  |
| Yield value (%) | 97 | 94 | 94 | 99 | 89 | 84 | 78 |
| High-shear viscosity (%) | 105 | 106 | 100 | 103 | 114 | 112 | 104 |
| Adhesion properties | X | X | Δ | Δ | ○ | X | X |

As apparent from Table 6, the polyvinyl chloride sol using each surface-treated calcium carbonate of Examples 1 to 11 in accordance with the present invention had high yield value and good thixotropic properties (low viscosity in a high shear condition) and a corresponding cured product showed good adhesion properties. In Comparative Examples 1 to 10, the test results showed that some sols had good viscosity but poor adhesion properties and others had good adhesion properties but poor viscosity. The control of the optimum particle size and the type and amount of an optimum surface treating agent in order to thoroughly disperse calcium carbonate is a key point in applied physical properties.

In Examples above, the surface-treated calcium carbonate added into various paste-like resin compositions has been exemplified. It is ascertained that the surface-treated calcium carbonate of the present invention can also impart high viscosity and excellent thixotropic properties to a printing ink and a paint when the calcium carbonate is added into the printing ink and the paint as with the above, such an ink and paint obtain excellent storage stability, and its cured product has good physical quality.

What is claimed is:

1. A calcium carbonate surface-treated with a surface-treating agent containing a sodium salt and/or a potassium salt of a fatty acid, the surface-treating agent containing a sodium salt or a potassium salt of palmitic saturated acid in an amount of PW (% of total fatty acid content by weight), the surface-treating agent containing a sodium salt or a potassium salt of saturated stearic acid in an amount of SW (% of total fatty acid content by weight), a total amount of PW and SW being PW+SW≥90, a ratio of PW to SW being 0.30≤PW/SW≤1.1, a sodium salt or a potassium salt of a saturated fatty acid except palmitic acid and stearic acid, among the fatty acids, being a saturated fatty acid having 12, 14, and 20 to 31 carbon atoms, a sodium salt or a potassium salt of lauric acid and a sodium salt or a potassium salt of myristic acid being included in a total amount of 5% of total fatty acid content by weight or less, a sodium salt or a potassium salt of an unsaturated fatty acid being included in an amount of 5% of total fatty acid content by weight or less, the surface-treated calcium carbonate having a BET specific surface area of SA$_2$ (m$^2$/g), the sodium salt or the potassium salt of the fatty acid being used for the treatment in an amount of FA (parts by weight) based on 100 parts by weight of calcium carbonate in terms of acid, the BET specific surface area ($SA_2$) being $15 \leq SA_2 \leq 48$, and a ratio ($FA/SA_2$) of the treatment amount (FA) to the BET specific surface area ($SA_2$) being $0.095 \leq FA/SA_2 \leq 0.135$, wherein the surface-treated calcium carbonate is extracted with diethyl ether to afford a treating agent extraction amount of 0.1% by weight.

2. The surface-treated calcium carbonate according to claim 1, wherein the sodium salt or the potassium salt of the unsaturated fatty acid is a sodium salt or a potassium salt of oleic acid, erucic acid, or linoleic acid.

3. A paste-like resin composition comprising the surface-treated calcium carbonate according to claim 1.

4. The paste-like resin composition according to claim 3, wherein the paste-like resin composition is a two-pack curable polyurethane paste-like resin composition.

5. The paste-like resin composition according to claim 3, wherein the paste-like resin composition is a two-pack curable polysulfide resin composition.

6. The paste-like resin composition according to claim 3, wherein the paste-like resin composition is a one-pack modified silicone resin composition.

7. The paste-like resin composition according to claim 3, wherein the paste-like resin composition is a PVC plastisol composition.

8. A cured product of the paste-like resin composition according to claim 3.

* * * * *